(12) United States Patent
Stokking et al.

(10) Patent No.: US 11,910,034 B2
(45) Date of Patent: Feb. 20, 2024

(54) NETWORK-BASED ASSISTANCE FOR RECEIVER PROCESSING OF VIDEO DATA

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Hans Maarten Stokking, Wateringen (NL); Frank Ter Haar, Woerden (NL); Hendrikus Nathaniël Hindriks, Gouda (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 17/312,883

(22) PCT Filed: Dec. 17, 2019

(86) PCT No.: PCT/EP2019/085497
§ 371 (c)(1),
(2) Date: Jun. 10, 2021

(87) PCT Pub. No.: WO2020/127157
PCT Pub. Date: Jun. 25, 2020

(65) Prior Publication Data
US 2022/0038756 A1 Feb. 3, 2022

(30) Foreign Application Priority Data
Dec. 21, 2018 (EP) .................. 18215169

(51) Int. Cl.
*H04N 21/234* (2011.01)
*H04N 21/435* (2011.01)

(52) U.S. Cl.
CPC ..... *H04N 21/23418* (2013.01); *H04N 21/435* (2013.01)

(58) Field of Classification Search
CPC ............. H04N 21/23418; H04N 21/435
See application file for complete search history.

(56) References Cited

U.S. PATENT DOCUMENTS 9,729,820 B1 * 8/2017 Holmes ............... H04N 7/152
2004/0034874 A1 * 2/2004 Hord ................. H04N 21/4147
348/E7.071

(Continued)

FOREIGN PATENT DOCUMENTS

WO    WO 2012/027891 A1    9/2010

OTHER PUBLICATIONS

Christian Frueh, Avneesh Sud, and Vivek Kwatra; "Headset Removal for Virtual and Mixed Reality", Aug. 3, 2017, In Proceedings of SIGGRAPH '17 Talks, Los Angeles, Ca, USA, Jul. 30 - Aug. 3, 2017 (Year: 2017).*

(Continued)

*Primary Examiner* — Dhairya A Patel
*Assistant Examiner* — Eui H Kim
(74) *Attorney, Agent, or Firm* — Hamilton, Brook, Smith & Reynolds, P.C.

(57) ABSTRACT

An intermediary system and method may be provided for assisting a receiver system in processing video data which is streamed as a video stream to the receiver system via a network. The processing of the video data by the receiver system may be dependent on an analysis of the video data. The intermediary system may provide processing assist data to the receiver system which comprises an analysis result or (Continued)

a processing instruction derived from the analysis results. Accordingly, the receiver system may process the video data without a need for the receiver system itself to analyze the video data, thereby offloading computational complexity to the intermediary system. Compared to techniques in which most or all of the processing is performed by the intermediary system, an advantage of continuing to process the video data at the receiver system is that the receiver system may already decode the video stream while the video stream is decoded and/or analyzed by the intermediary system, thereby reducing the delay from transmission to display of the video stream.

22 Claims, 10 Drawing Sheets

(56) References Cited

U.S. PATENT DOCUMENTS

| | | | |
|---|---|---|---|
| 2008/0152245 A1 | 6/2008 | El-Maleh et al. | |
| 2009/0259941 A1* | 10/2009 | Kennedy, Jr. | G06F 16/785 |
| | | | 715/719 |
| 2011/0016487 A1* | 1/2011 | Chalozin | H04N 21/258 |
| | | | 725/35 |
| 2013/0094590 A1 | 4/2013 | Laksono et al. | |
| 2014/0146084 A1 | 5/2014 | Polo et al. | |
| 2016/0080698 A1* | 3/2016 | Mariadoss | G08B 13/19613 |
| | | | 348/143 |
| 2016/0275642 A1 | 9/2016 | Abeykoon et al. | |
| 2018/0144476 A1 | 5/2018 | Smith | |
| 2019/0215105 A1* | 7/2019 | Xu | H04L 1/0009 |

OTHER PUBLICATIONS

M. J. Prins, S. Gunkel and O. Niamut, "*TogetherVR: A Framework for Photo-Realistic Shared Media Experiences in 360-Degree VR*" in International Broadcasting Conference, 2017.

K. Park and R. Mekuria, "*Use cases and requirements for NBMP (v4),*" MPEG, ISO/IEC JTC1/SC29/WG11 MPEG2018/N17502, Apr. 2018, 31 pages.

Burgos-Artizzu, X. P., Fleureau, J., Dumas, O., Tapie, T., LeClerc, F., & Mollet, N., "*Real-time expression-sensitive HMD face reconstruction*", in SIGGRAPH Asia 2015 Technical Briefs (p. 9), ACM.

Wen et al. "*Cloud Mobile Media: Reflections and Outlook,*" IEEE Transactions on Multimedia, vol. 16, No. 4, Jun. 2014 pp. 885-902.

International Search Report for International Application No. PCT/EP2019/085497, titled: "Network-Based Assistance for Receiver Processing of Video Data," dated Dec. 17, 2019.

European Search Report for EP Application No. 18215169.6, titled: "Network-Based Assistance for Receiver Processing of Video Data," dated Jun. 25, 2019.

* cited by examiner

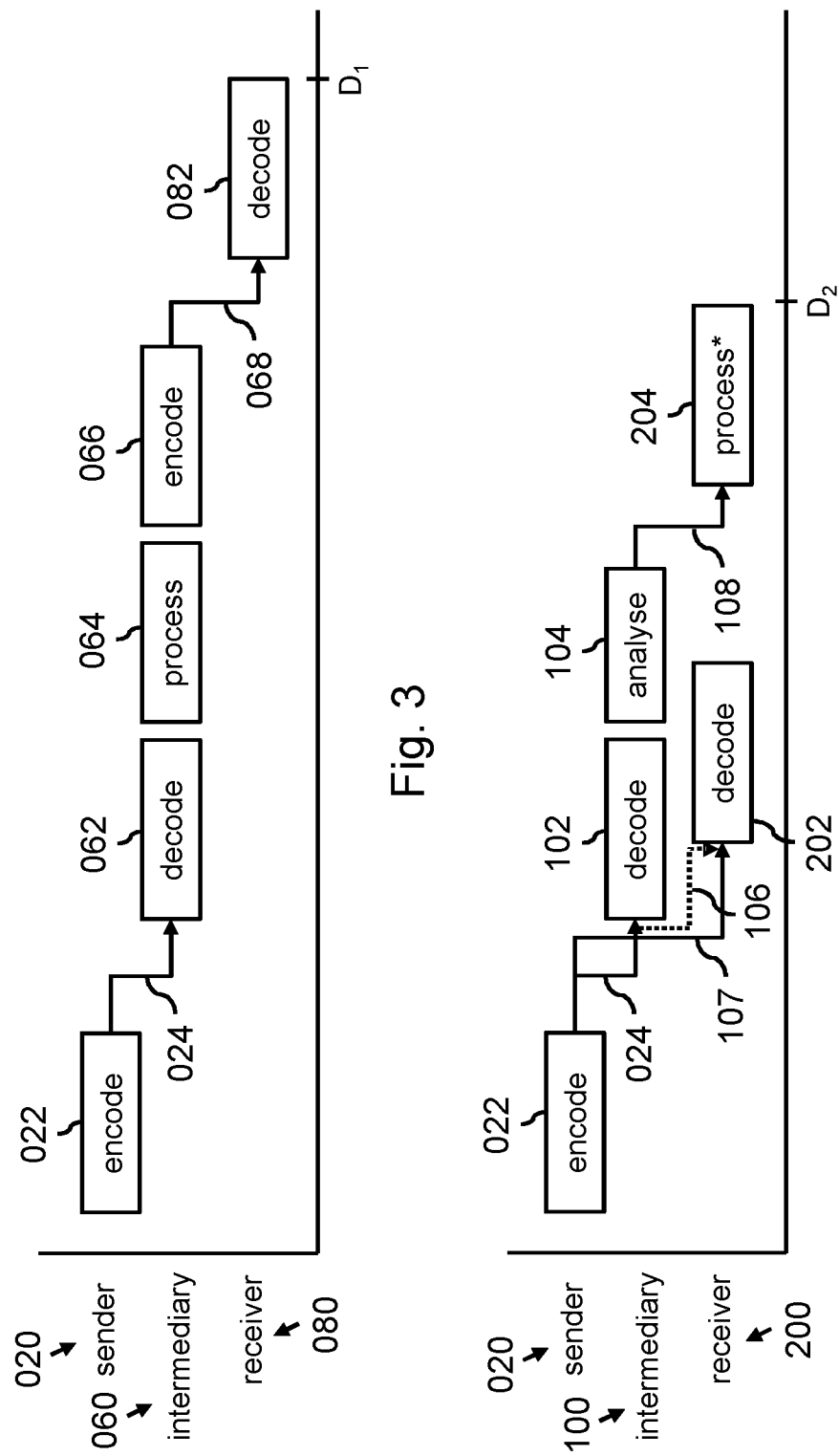

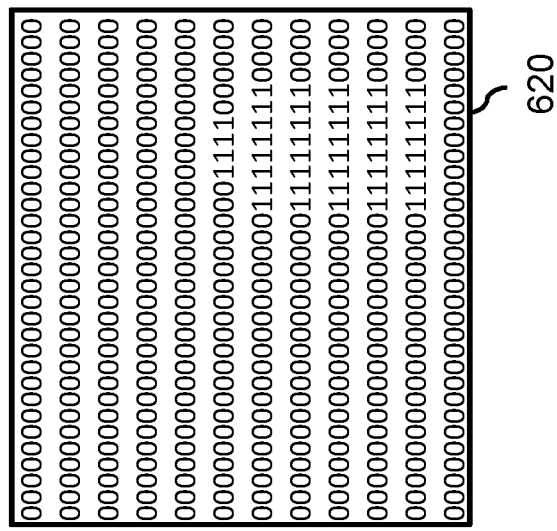
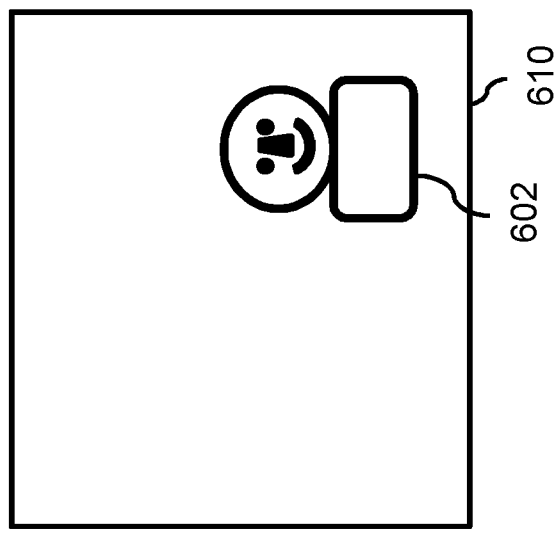
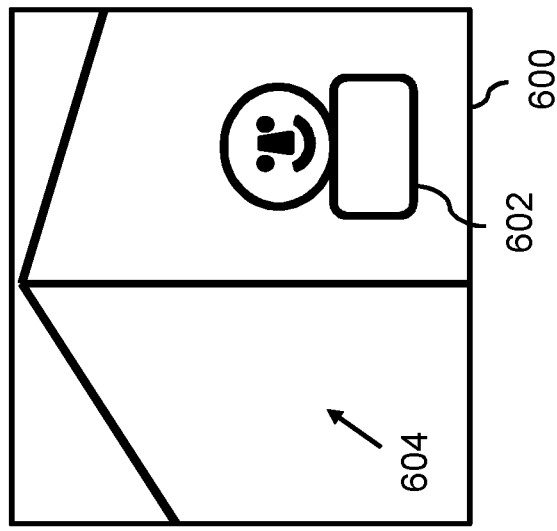
Fig. 6A
Fig. 6B
Fig. 6C

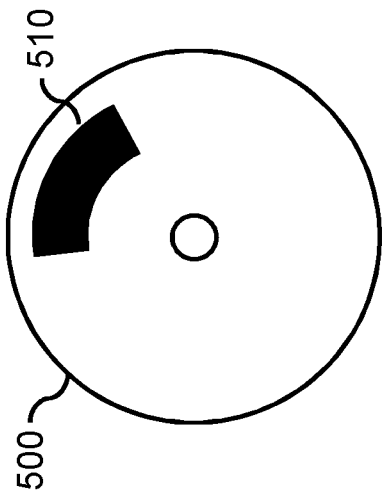
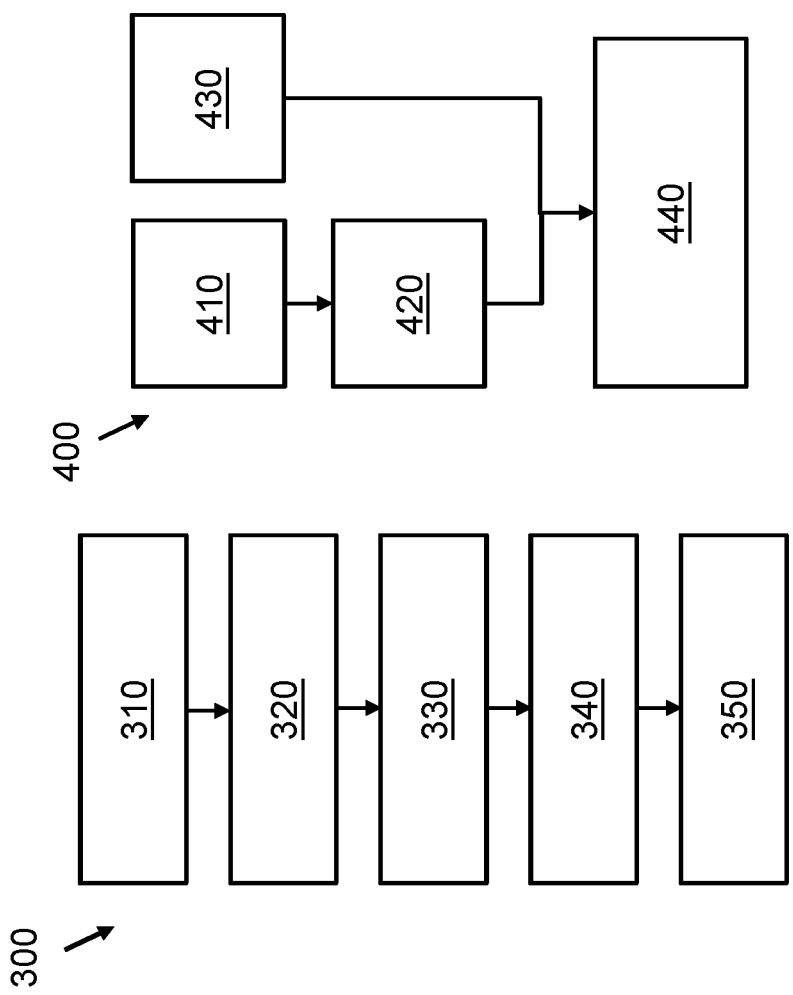
Fig. 13
Fig. 12
Fig. 11

NETWORK-BASED ASSISTANCE FOR RECEIVER PROCESSING OF VIDEO DATA

This application is the U.S. National Stage of International Application No. PCT/EP2019/085497, filed Dec. 17, 2019, which designates the U.S., published in English, and claims priority under 35 U.S.C. § 119 or 365(c) to European Application No. 18215169.6, filed Dec. 21, 2018. The entire teachings of the above applications are incorporated herein by reference.

FIELD OF THE INVENTION

The invention relates to a method and processor system for assisting a receiver system in processing video data which is streamed as a video stream to the receiver system via a network. The invention further relates to a computer readable medium comprising processing assist data for use in the processing of the video data. The invention further relates to a method and a processor system representing the receiver system for processing the video data using the processing assist data. The invention further relates to a computer program for carrying out either method.

BACKGROUND ART

Media content such as video content and audio content is commonly delivered to users in digital form. If media content has a temporal aspect, and in particular is associated with a timeline which indicates how the media content is to be played-out over time, such digital form is typically referred to as a media stream.

Video streams may contain video data which may need to be processed to be used in a particular application. For some applications, such processing of the video data may be computationally complex. For example, in VR or AR-based multiuser communication, a live camera recording of a user may be shown in a virtual environment, which in AR may be displayed as an overlay over the real physical environment of a user. An example of such an application for VR is described by [1].

For example, to make the live camera recording of a user suitable for being shown in the virtual environment, the video may need to be processed, for example to perform so-called background removal, also called foreground/background segmentation, by which the surroundings of the user in the live camera recording are removed or made transparent. Another example is the replacement of a Head-Mounted Display (HMD) worn by a user in the live camera recording by a 3D model of the user's face, possibly including proper eye placement and adjusted facial expressions, see for example [3]. Yet another example is the rotating or otherwise adjusting of a video to compensate for the orientation of the physical camera relative to the captured user not being the same as the orientation of a representation of the live camera recording in the virtual environment to an observer. The latter processing technique is also called free viewpoint or multiple viewpoint rendering or calculation. Such multiple viewpoint rendering or calculation may also be based on multiple camera input.

These and various other examples of processing of video may be too computationally complex for end-user devices to carry out. For example, the above examples of processing of video may be too complex to be carried out by a device sending the live camera recording or a device receiving the live camera recording. Too complex may mean that the performance of the entire system may suffer, e.g., the processing may significantly burden the system and may cause overloads.

It is known to perform video processing in the cloud, e.g., using the resources of one or more network nodes. For example, [2] discusses so-called Network-Based Media Processing (NBMP), which may be used to perform media processing, such as processing of video, in a network or cloud environment.

However, NBMP and similar techniques introduce additional decoding and encoding operations, since the video processing typically needs to be performed in the uncompressed domain but the processed video typically needs to be encoded again for efficient transmission to a receiver system. Therefore, the network entity performing the NBMP typically has to decode the received video stream, process the decoded video data to obtain processed video, and then again encode the processed video data as a video stream before finally transmitting the video stream to the receiver system.

A disadvantage of NBMP is that the decoding and encoding operations introduce an additional, and typically sizable, delay in the transmission of a video stream to a receiver system. Such additional delays may be undesirable, particularly if the video stream is used in real-time communication. Namely, for optimum communication, a one-way delay, e.g., from a sender system to a receiver system, is preferably kept below approximately 150 ms, which may not be reachable when having to perform the abovementioned decoding and encoding operations, or may require concessions elsewhere, e.g., in encoding quality. Also outside of real-time communication, such delays may be preferably kept to a minimum, e.g., to maintain responsiveness when starting a video stream, switching between video streams, etc.

REFERENCES

[1] M. J. Prins, S. Gunkel and O. Niamut, "*TogetherVR: A Framework for Photo-Realistic Shared Media Experiences in 360-Degree VR*" in International Broadcasting Conference, 2017.

[2] MPEG, ISO/IEC JTC1/SC29/WG11 MPEG2018/N17502, Use cases and requirements for NBMP (v4), April 2018

[3] Burgos-Artizzu, X. P., Fleureau, J., Dumas, O., Tapie, T., LeClerc, F., & Mollet, N., "*Real-time expression-sensitive HMD face reconstruction*", in SIGGRAPH Asia 2015 Technical Briefs (p. 9), ACM.

SUMMARY OF THE INVENTION

It would be advantageous to assist a receiver system in processing video data which is streamed as a video stream to the receiver system via a network, in which the delay of transmission of the video stream from a sender system to the receiver system may be reduced compared to known techniques such as NBMP.

In accordance with a first aspect of the invention, a processor system is provided which may be configured for assisting a receiver system in processing video data which may be streamed as a video stream to the receiver system via a network. The processing of the video data by the receiver system may be dependent on an analysis of the video data. The processor system may comprise:

a network interface to the network;
a processor which may be configured to:
via the network interface, receive the video stream;

decode at least part of the video stream to obtain a decoded video data part;

analyze the decoded video data part to obtain an analysis result;

generate processing assist data comprising the analysis result or a processing instruction derived from the analysis results;

via the network interface, provide the processing assist data to the receiver system to enable the receiver system to process the video data using the analysis result or the processing instruction provided by the processing assist data.

In accordance with a further aspect of the invention, a processor system is provided which may be configured for processing video data which may be received as a video stream via a network. The processor system may comprise:

a network interface to the network;

a processor which may be configured to:

via the network interface, receive the video stream;

decode the video stream to obtain the video data;

process the video data to obtain processed video data, wherein the processing is dependent on an analysis of at least part of the video data;

wherein the processor may be further configured to:

via the network interface, receive processing assist data comprising an analysis result of the analysis of at least the part of the video data, or a processing instruction derived from the analysis results; and perform the processing of the video data using the analysis result or the processing instruction provided by the processing assist data.

In accordance with a further aspect of the invention, transitory or non-transitory computer-readable medium is provided which may comprise processing assist data. The processing assist data may comprise an analysis result of an analysis of video data, or a processing instruction derived from the analysis results. The processing assist data may enable a receiver system which receives the video data as a video stream to process the video data using the analysis result or the processing instruction provided by the processing assist data.

In accordance with a further aspect of the invention, a computer-implemented method is provided which may assist a receiver system in processing video data which is streamed as a video stream to the receiver system via a network. The processing of the video data by the receiver system may be dependent on an analysis of the video data. The method may comprise:

via the network, receiving the video stream;

decoding at least part of the video stream to obtain a decoded video data part;

analyzing the decoded video data part to obtain an analysis result;

generating processing assist data comprising the analysis result or a processing instruction derived from the analysis results;

via the network, providing the processing assist data to the receiver system to enable the receiver system to process the video data using the analysis result or the processing instruction provided by the processing assist data.

In accordance with a further aspect of the invention, a computer-implemented method may be provided for processing video data which is received as a video stream via a network. The method may comprise:

via the network, receiving the video stream;

decoding the video stream to obtain the video data;

processing the video data to obtain processed video data, wherein the processing is dependent on an analysis of at least part of the video data;

wherein the method may further comprise:

receiving processing assist data comprising an analysis result of the analysis of at least said part of the video data, or a processing instruction derived from the analysis results; and performing the processing of the video data using the analysis result or the processing instruction provided by the processing assist data.

In accordance with a further aspect of the invention, a transitory or non-transitory computer-readable medium is provided comprising a computer program. The computer program may comprise instructions for causing a processor system to perform either or both of the abovementioned computer-implemented methods.

The above measures may be based on the consideration that processing of video data may, in many if not most cases, be partitioned in an analysis phase and a subsequent processing phase which uses a result of the analysis phase to control or configure the processing. A non-limiting example is the aforementioned background removal by which the surroundings of the user in the live camera recording are removed or made transparent. Such background removal may involve analyzing the video data to obtain a segmentation of foreground vs. background, for example, in the form of a segmentation mask which may contain values such as '1' for foreground and '0' for background. The segmentation mask may then be used to control a subsequent processing by which the background may be removed or made transparent.

Such analysis may in some cases also be considered a 'pre'-processing of the video data, in that the analysis may involve applying one or more processing steps to the video data, thereby obtaining preprocessed video data which may be used to control or configure a subsequent processing of the video data. Such preprocessing of the video data may be distinguished from the subsequent processing in that the subsequent processing may still use the non-preprocessed video data as input, with the preprocessed video data rather being used to control or configure the processing. Effectively, the subsequent processing may receive the non-preprocessed video data as data input while using the processed video data as control or configuration input. In the above and following, a preprocessing of the video data which obtains preprocessed video data which may be used to control or configure a subsequent processing of the non-preprocessed video data may be considered an example of an analysis of the video data, and the preprocessed video data an example of an analysis result.

The above measures may be applied to an overall system or network in which a receiver system receives a video stream of a sender system. An intermediary system, which may be different from the sender system, may be provided and configured to also receive the video stream of the sender system and to decode and analyze at least part of the video stream. The intermediary system may then generate processing assist data which may comprise the analysis result or a processing instruction derived from the analysis result. The processing assist data may then be provided to the receiver system to enable the receiver system to process the video data using the analysis result or the processing instruction provided by the processing assist data. Such an intermediary system may elsewhere also simply be described as a processor system configured for generating the processing assist data.

The processing assist data generated by the intermediary system does not replace the video stream of the sender system, but may rather be used to control or configure the subsequent processing by the receiver system of said video stream. As such, it may not be needed for the receiver system to await the processing assist data from the intermediary system, but rather, the receiver system may already receive and decode the video stream of the sender system, for example in a way which at least partially overlaps in time with the intermediary system receiving and decoding the video stream. Once the processing assist data is received by the receiver system from the intermediary system, the receiver system may then immediately or at least quickly start the subsequent processing of the decoded video data. Compared to NBMP and similar techniques, the intermediary system may effectively omit the video encoding, and accordingly, the receiver system does not have to await the intermediary system to finish such video encoding and subsequent streaming of the encoded video stream. Rather, the receiver system may already start receiving and decoding the video stream of the sender system. Effectively, the decoding by the intermediary system and by the receiver system may be at least partially parallelized, compared to NBMP's serial steps. Thereby, the delay in the transmission of a part of a video stream from a sender system to a receiver system, and in particular to the receiver system obtaining a decoded and processed video data part, may be reduced, e.g., compared to NBMP and similar techniques. Nevertheless, the receiver system may be assisted in the processing, since the analysis may be computationally complex and may, by the above measures, be 'offloaded' to the intermediary system, which may for example be a cloud-based system. Thereby, the receiver system does not have to perform the analysis itself, or has to perform only a limited part of the analysis.

The above advantages may also apply if the processing assist data comprises preprocessed video data, since preprocessed video data which is provided to the receiver system to control or configure the subsequent processing of other video data is typically of a different nature than the processed video data provided by NBMP and similar techniques. Namely, typically such preprocessed video data contains non-display data such as a mask for foreground/background segmentation as explained above, rather than actual video data intended for display. Such type of preprocessed video data which is not intended for display is typically substantially smaller, particularly when encoded and even when encoded lossless, than video data which is processed for display and/or may be encoded using less complex encoding techniques. The preprocessed video data may thereby be faster to encode by the intermediary system and faster to decode by the receiver system. Moreover, as the compression of such preprocessed video data may achieve or use higher compression ratios than the compression of regular video data, the transmission of compressed preprocessed video data may start earlier, e.g., with less delay caused by the preceding compression operation, than the transmission of compressed regular video data. As such, even if the analysis result takes the form of preprocessed video data, the delay in the transmission of a video stream from a sender system to a completion of processing by a receiver system may still be reduced, e.g., compared to NBMP and similar techniques.

It will be appreciated that if only a part of the video data is analyzed, the resulting processing assist data may be applied to the same or similar part of the video data, but in some embodiments also to other parts of the video data. For example, when the analysis result is time-invariant, or at least to a certain degree, the analysis result may also be applied to other parts of the video data. In other embodiments, the video data may be analyzed on a periodic basis. For example, if the analysis is frame-based, every $n^{th}$ video frame may be analyzed, with $n \geq 1$. The selection of n may depend on the time (in)variance of the video data, e.g., an amount of motion.

The following embodiments relate to the processor system, and mutatis mutandis to the computer-implemented method, for generating the processing assist data, but may denote complementary limitations in the processor system and computer-implemented method for using the processing assist data.

In an embodiment, the processor may be configured to analyze the decoded video data part by at least one of the group of:
  a segmentation technique, whereby the analysis result comprises a segmentation of an object in the decoded video data part;
  an object tracking technique, whereby the analysis result comprises a position of an object in the decoded video data part; and
  a calibration technique, whereby the analysis result comprises a calibration parameter used in the processing of the video data.

The above are specific yet non-limiting examples of the types of analysis which may be offloaded to an intermediary system and of which the analysis result may be encoded as processing assist data and used by the receiver system in the subsequent processing of the video data. Non-limiting examples of segmentation include foreground/background segmentation. Object tracking may, for example in the specific field of VR-based multiuser communication, include eye/iris tracking or the tracking of an HMD in the decoded video data for replacement by a model of a user.

In an embodiment, the processing of the video data by the receiver system may comprise compositing an object into the video data, and the processor may be configured to, via the network interface, provide object data to the receiver system, the object data defining at least part of the object, and analyze the decoded video data part to determine, as the analysis result to be included in the processing assist data, a characteristic of said composition of the object into the video data, such as a position and/or orientation of the object. It may be desirable for the receiver system to composite an object into the video data, such as a 2D or 3D graphics-based object. The composition may be adjusted to a content of the video data, which may therefore have to be analyzed. Such type of analysis may be computationally complex, but may be 'offloaded' to the intermediary system which may then indicate a characteristic of the composition as part of the processing assist data. A non-limiting example of such an object may be a 3D model of the user's face or head, which may be inserted into the video data by the receiver system to replace an HMD worn by the user. The processing assist data may for example indicate which part of the 3D model is to be used to fully cover the HMD in a video frame, the exact or approximate position and orientation of the HMD in the video frame, and the angle at which the 3D model is to be shown. In some embodiments, the receiver system may already have received the object data, e.g., from another system, at a start of the communication session, etc.

In an embodiment, the processor may be configured to include timing information in the processing assist data, wherein the timing information may be indicative of the part of the video stream or the decoded video data part from which the processing assist data was generated. Such timing information may allow the receiver system to determine to which part of the video stream or to which decoded video data part the analysis result or the processing instruction pertains. For example, the timing information may comprise a sequence number or a content timestamp. Effectively, the timing information may be used to synchronize the received processing assist data in time to the receiver system's processing of received and decoded video data.

In an embodiment, the processor may be configured to:
  sequentially decode the video stream to obtain a series of decoded video data parts;
  sequentially analyze, and generate processing assist data for, individual ones of the decoded video data parts to obtain a series of processing assist data; and
  provide the series of processing assist data to the receiver system as a processing assist data stream.

Such sequential decoding, analysis and providing of the processing assist data may be well-suited to reduce or minimize end-to-end delay in video streaming. Namely, instead of decoding and analyzing all of the video stream, which may cause a a sizable delay in case of a lengthy video stream, the decoding and analysis may be sequentially applied to parts of the video stream, e.g., individual video frames or so-called groups of pictures, and the processing assist data may be sequentially generated as a series of processing assist data which may be sequentially transmitted to form a processing assist data stream. Upon receiving an individual part of the processing assist data stream, the receiver system may process the corresponding part of the video stream. In some embodiments, a differential encoding of the processing assist data may be used, in which changes may be sent to the receiver system, e.g., representing a relative signaling of the analysis result instead of an absolute signaling.

In an embodiment, the processor may be configured to, via the network interface, receive the video stream from a stream source in the network and to forward the video stream to the receiver system. Instead of the receiver system receiving the video stream directly from the sender system, which may also be referred to as 'stream source', the receiver system may receive the video stream from the intermediary system. However, to avoid unnecessary delay, the intermediary system may be configured to forward the received video stream to the receiver system. Such forwarding typically does not await, nor is intrinsically linked to, the decoding of the video stream by the intermediary system, and thereby may cause only little delay.

The following embodiments relate to the processor system, and mutatis mutandis to the computer-implemented method, for using the processing assist data, but may denote complementary limitations in the processor system and computer-implemented method for generating the processing assist data.

In an embodiment, the processing assist data may comprise a segmentation of an object in the part of the video data, and the processor may be configured to use the segmentation of the object for processing video data of the object or video data outside of the object. Segmentation may require computationally complex analysis, but segmentation results may be efficiently signaled to the receiver system, for example as coordinates defining a contour or as a 1-bit segmentation mask. Accordingly, segmentation is well-suited for 'offloading' to an intermediary system.

In an embodiment, the processing assist data may comprise timing information, wherein the timing information may be indicative of the part of the video stream or the decoded video data part from which the processing assist data was generated, and wherein the processor may be configured to identify the part of the video stream or the decoded video data part on the basis of the timing information and to use the analysis result or the processing instruction provided by the processing assist data specifically for the processing of said part.

In a further aspect of the invention, a system is provided comprising the processor system for generating the processing assist data as intermediary system and the processor system for using the processing assist data as receiver system, wherein:
  both the intermediary system and the receiver system may be configured to receive the video stream from a stream source in the network; or
  the intermediary system may be configured to receive the video stream from the stream source in the network and forward the video stream to the receiver system.

Both scenarios have in common that the video stream may be transmitted to the receiver system with little delay, e.g., without the intermediary system having to decode, process and then re-encode the video stream and the receiver system having to receive the re-encoded video stream from the intermediary system. Effectively, both the intermediary system and the receiver system may start decoding the video stream, and subsequently decode respective parts of the video stream, almost simultaneously or at least overlapping in time, with differences in the temporal alignment between the decoding being primarily due to difference in network delay to the stream source. It may therefore not be needed for the receiver system to await the intermediary system decoding a particular part of the video stream.

Besides the abovementioned decoding which may be performed at least to a degree in parallel by the intermediary system and the receiver system, there may be yet another advantage which allows for an intermediary system to perform analysis or processing while causing no or only limited additional delay in the end-to-end delay in the chain between a stream source and a receiver system. Namely, a receiver system may typically decode a video for the purpose of displaying the video. To ensure smooth playback, the receiver system typically uses a buffer to deal with jitter in the arriving video stream packets. To ensure continuous playback, e.g., 100 ms may be buffered to prevent buffer underruns. As the intermediary system may not perform playback, it may not need such a buffer, e.g., it may process video frames as soon as they arrive.

It will be appreciated by those skilled in the art that two or more of the above-mentioned embodiments, implementations, and/or aspects of the invention may be combined in any way deemed useful.

Modifications and variations of the method, the processor system(s), the processing assist data and/or the computer program, which correspond to the modifications and variations described for another one of said entities, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 3 shows a timing diagram associated with FIG. 1;

FIG. 4 shows a timing diagram associated with FIG. 2;

FIGS. 6A-C show an example of foreground/background segmentation, for which the intermediary system may generate a segmentation mask and provide the segmentation mask to the receiver system as processing assist data;

FIGS. 7A-7H show an example of HMD removal, for which the intermediary system may detect the HMD in a video frame and provide the position and orientation of the HMD in the video frame as processing assist data to the receiver system;

FIG. 11 shows a method for assisting a receiver system in processing video data by providing processing assist data to the receiver system;

FIG. 12 shows a method for processing video data using processing assist data received from an intermediary system;

FIG. 13 shows a computer-readable medium comprising non-transitory data;

Figure 1:
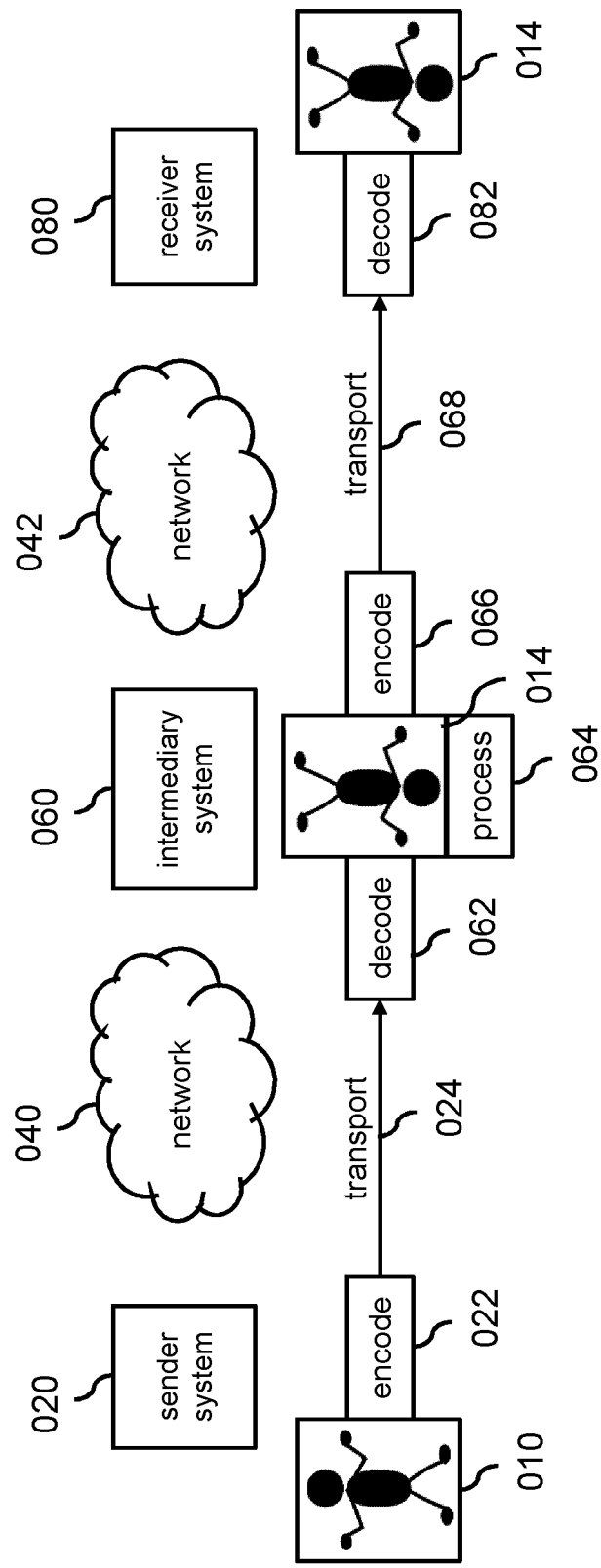
FIG. 1 shows processing of video data by an intermediary system in a network, in which the processed video data is encoded and transmitted to a receiver system to substitute for the processing of the video data by the receiver system.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

010 video data
012 pre-processed video data
014 processed video data
020 sender system
022 encode as video stream
024 transport video stream
040, 042 network
060 (NBMP-based) intermediary system
062 decode video stream
064 process video data
066 encode as video stream
068 transport video stream
080 receiver system
082 decode video stream
100 intermediary (processor) system
102 decode at least part of video stream
104 analyse video data part
106 forward video stream
107 transport video stream
108 provide processing assist data
110 processing assist data
120 network interface
122 network data communication
140 processor
160 data storage
200 receiver (processor) system
202 decode video stream
204 process video data using processing assist data
220 network interface
222 network data communication
240 processor
260 display output
262 display data
280 display
300 method for assisting receiver system in processing video data
310 receiving video stream
320 decoding at least part of video stream
330 analyzing decoded video data part
340 generating processing assist data
350 providing processing assist data to receiver system
400 method for processing video data received as video stream
410 receiving video stream
420 decoding video stream
430 receiving processing assist data from intermediary system
440 processing video data using processing assist data
500 computer readable medium
510 non-transitory data
600 video frame
602 person (foreground)
604 room (background)
610 video frame after background removal
620 foreground/background segmentation mask
700, 702 video frame
710 HMD
720 3D model of user
730, 732 selected part of 3D model
740, 742 image part showing selected part of 3D model
750, 752 video frame after HMD removal
800 user recorded by handheld camera
802 room
810-814 handheld camera
820-824 video frame recorded by handheld camera
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

Some of the following embodiments are described within the context of 'Social VR' where a number of users participate in a teleconference using HMDs and cameras and in which it may be desirable to process a video containing a live camera recording of a user to make the video suitable for being shown in the virtual environment, for example by background removal or the replacement of an HMD by a 3D model of the user's face. However, the processing assist data and the framework for generating, transmitting and using the processing assist data as described in this specification may also be applied in all other applications in which the processing of the video comprises an analysis phase which may, at the receiver system, be substituted by an analysis result or a processing instruction derived from the analysis result. A typical example may be the replacing of items in a video by other items, e.g., for product placement, such as showing the local beer instead of a national beer brand.

It is further noted that in the following, any reference to a 'video stream' may refer to a data representation of a video which is suitable for being streamed, e.g., using known streaming techniques. Any reference to 'video encoding' and/or 'video decoding' may refer to the use of any suitable video coding technique, including but not limited to video coding techniques based on MPEG-2 Part 2, MPEG-4 Part 2, H.264 (MPEG-4 Part 10), HEVC, etc. Furthermore, a reference to a 'video' may include a video stream but also a data representation of the video which is not (yet) suitable for being streamed or at least conventionally not intended for streaming. In the Figures, video (streams) may be schematically represented by a single video frame.

FIG. 1 shows a processing of video data by an intermediary system in a network, which may for example represent a use of NBMP [2]. Here, a sender system 020, which may elsewhere also be referred to as 'stream source', may obtain a video 010, encode 022 the video as a video stream and transmit 024 the resulting video stream via a network 040 to an intermediary system 060. Such transmission via a network is here and elsewhere also referred to as 'transport'. The intermediary system 060 may then decode 062 the video stream to obtain decoded video data, process 064 the decoded video data to obtain processed video data 014 (with the processing being symbolically shown in FIGS. 1 and 2 as a mirroring of the contents of the video data 010), encode 066 the processed video data 014 to obtain a video stream, and transmit 068 the video stream via a network 042 to a receiver system 080. The receiver system 080 may then decode 082 the video stream, thereby obtaining decoded and already processed video data 014. The receiver system 080 may then further use the processed video data 014, e.g., for play-out of the processed video data 014 on a display, and in some cases may further post-process the processed video data 014, e.g., using display-specific processing adapted to a specific type of display, etc.

As indicated earlier and also further discussed with reference to FIG. 3, the delay between the sender system 020 starting to transmit the video stream and the receiver system 080 receiving the video stream via the intermediary system 060 may be larger than desired. The same applies on an ongoing basis to respective parts of the video stream, e.g., the delay between transmitting and receiving a video stream part.

Figure 2:
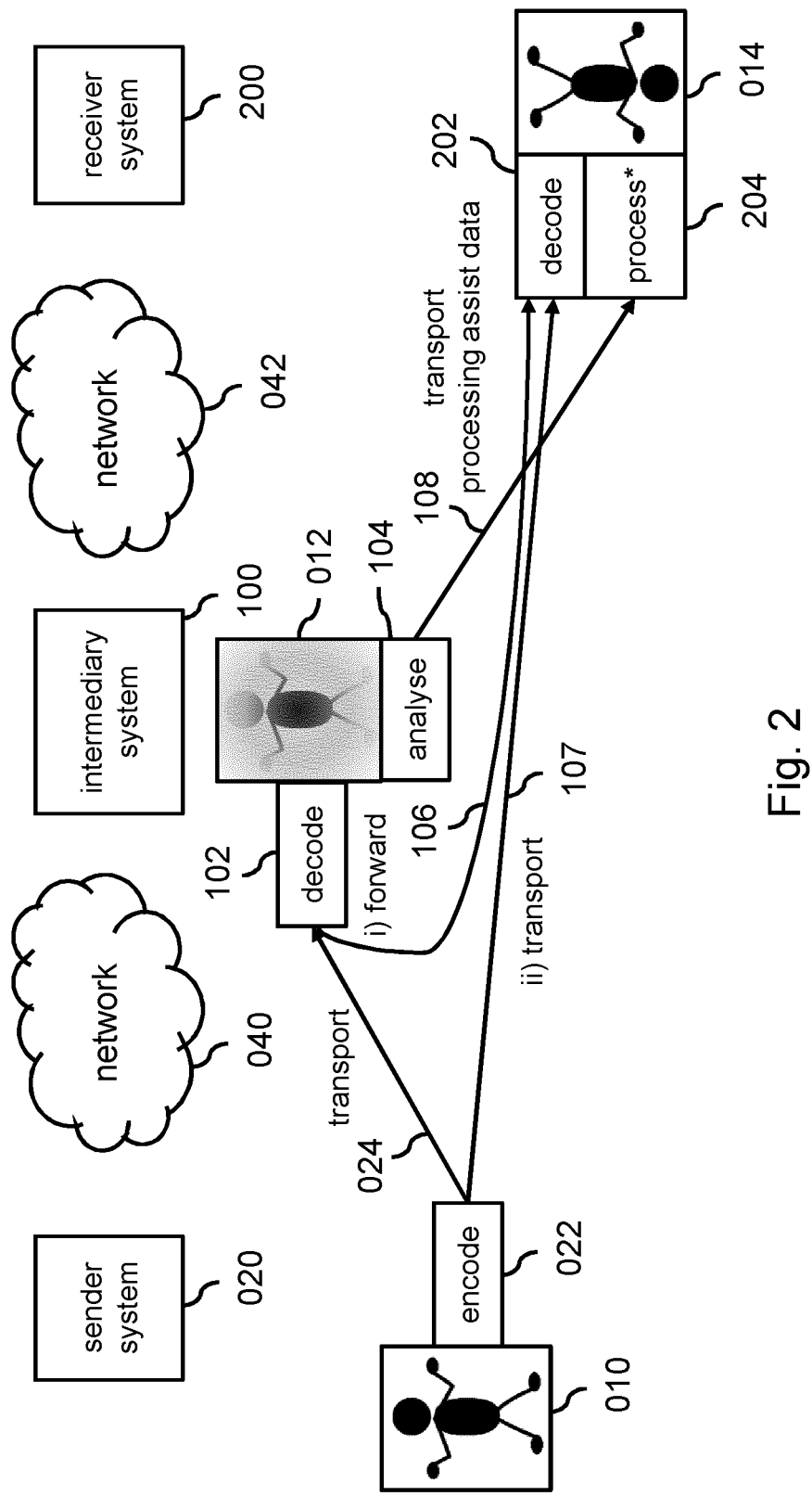
FIG. 2 shows an intermediary system which is configured to analyze at least part of the video data of a video stream, to generate processing assist data containing an analysis result or a processing instruction derived from the analysis results, and to provide the processing assist data to a receiver system to enable the receiver system to process the video data using the analysis result or the processing instruction.

FIG. 2 shows an intermediary system 100 which may be configured to analyze rather than fully process the video data 010, and to provide processing assist data to a receiver system 200 rather than a fully processed video stream. Effectively, the analysis of the intermediary system 100 may represent a processing of the video data 010 which yields output data not intended for display, but rather to control or configure the subsequent processing of the video data by the receiver system 200.

Here, the sender system 020, which may in some embodiments be the same or similar sender system as the sender system 020 of FIG. 1, may obtain a video 010, encode 022 the video 010 as a video stream and transmit 024 the resulting video stream via the network 040 to the intermediary system 100. The intermediary system 100 may then decode 102 at least part of the video stream to obtain a decoded video data part, analyze 104 the decoded video data part to obtain an analysis result, and generate processing assist data comprising the analysis result or a processing instruction derived from the analysis results, which processing assist data may then be provided 108 to the receiver system 200 via the network 042. The receiver system 200 may also receive the video stream of the sender system 020, either directly via transmission 107 by the sender system 020, indirectly by the intermediary system 100 forwarding 106 the received video stream to the receiver system 200, or by a network node forking the stream to both the intermediary system and the receiver system (not shown in the figure). The receiver system 200 may then decode 202 the received video stream to obtain decoded video data, and then process 204 the video data using the analysis result or the processing instruction provided by the processing assist data. Such processing using the processing assist data is in FIGS. 2 and 4 also indicated with an asterisk (*) to distinguish from the processing 064 of FIG. 1 which includes the analysis as an integral part.

When following the example of the mirroring of the video data, the processing assist data may contain a processing instruction which instructs the receiver system 200 to mirror the video data along a particular axis, with the need for mirroring and/or the axis being determined by the analysis 104 (which is visually indicated by an adjusted depiction of the figure). Various other types of analysis results and/or processing instructions are also conceivable, and discussed with reference to FIG. 5.

It is noted that in FIGS. 1 and 2, the networks 040, 042 may represent a same type of network, such as the Internet. However, the networks 040, 042 may also represent different networks, or adjoining parts of a same network, or partially overlapping parts of a same network. For example, the network 040 may include a part of a core network of a telecommunication network, while the network 042 may include a same or adjoining part of the core network and an access network.

FIG. 3 shows a timing diagram associated with FIG. 1, in which the reference numerals of FIG. 1 are maintained. In FIG. 3, the encoding 022, transmission 024, decoding 062, processing 064, encoding 066, transmission 068 and decoding 082 of a respective part of the video data by respectively the sender system 020, the intermediary system 060 and the receiver system 080 of FIG. 1 are shown along a time axis. For sake of illustration, the encoding, decoding and processing steps are shown as taking a same or similar amount of time, and the transmission is only shown indirectly by connecting arrows 024, 068. It will be appreciated, however, that in general the absolute and/or relative time allocation of respective steps may vary depending on various factors, such as the complexity of the processing, the type of video coding technique, and the network delay between respective entities. It can be seen that the overall delay between encoding 022 by the sender system 020 and the decoding 082 of the processed video data by the receiver system 080 equals $D_1$, which may effectively correspond to the sum of all delays of all sequential steps.

FIG. 4 shows a timing diagram associated with FIG. 2, in which the reference numerals of FIG. 2 are maintained. In FIG. 4, the encoding 022, transmission 024, transmission 107 or forwarding 106, decoding 102, decoding 202, analyzing 104, transmission 108 and processing 204 of a respective part of the video data by respectively the sender system 020, the intermediary system 100 and the receiver system 200 of FIG. 2 are shown along a time axis. As previously, the processing using the processing assist data is indicated with an asterisk (*) to distinguish from the processing 064 of FIG. 3 which includes the analysis as an integral part.

It can be seen that the decoding 102 of a video stream part by the intermediary system 100 and the decoding 202 of the same video stream part by the receiver system 200 may be at least partially performed in parallel, or at least the decoding 202 may not have to await the transmission 108 of the processing assist data since the decoding 202 of the video stream part does not require the processing assist data. The degree of parallelism may depend on various factors, including network delays. For example, in some embodiments, the network delay between the sender system 020 and the intermediary system 100 may be smaller than the network delay between the sender system 020 and the receiver system 200, thereby causing the transmission 107 of the video stream from the sender system 020 to the receiver system 200 to take longer than the transmission 024 of the video stream from the sender system 020 to the intermediary system 100. An example is that the sender system 020 and the intermediary system 100 may be both located in a core network of a telecommunication network, whereas the receiver system 200 may be connected to the core network via an access network. Similarly, if the video stream is forwarded 106 by the intermediary system 100 to the receiver system 200 instead of being directly transmitted by the sender system 020, the decoding 202 by the receiver system 200 may also be delayed compared to the decoding 102 by the intermediary system 100.

It can be seen that the overall delay between the encoding 022 by the sender system 020 and the receiver system 200 obtaining a decoded and processed video data part may correspond to $D_2$, which may be smaller than $D_1$ of FIG. 1 and may in some embodiments be principally determined by the delays of the encoding 022, transmission 024, decoding 102, analyzing 104, transmission 108 and processing 204. In some embodiments, the decoding 202 may not be in the critical path with respect to determining the overall network delay and may thereby not contribute to the overall network delay, or may only contribute partially rather than for its full time-duration.

Another factor in the end-to-end delay from streaming a video stream by a stream source to display of a video stream by the receiver system may be buffering. Typically, before decoding a video stream, the video stream may be buffered at the receiver system. This may be done to ensure continuous playback. As networks may cause jitter, i.e. certain packets on the network may suffer larger delays than others, buffering may be used to ensure that decoding and displaying of video frames may be continuous. This buffering is typically one of the major factors in the end-to-end delay. As the intermediary system may not (have to) display the video, the intermediary system may omit buffering the video stream before processing, or suffice with a much more limited buffer, and may in general simply process the video stream as it arrives.

Figure 5:
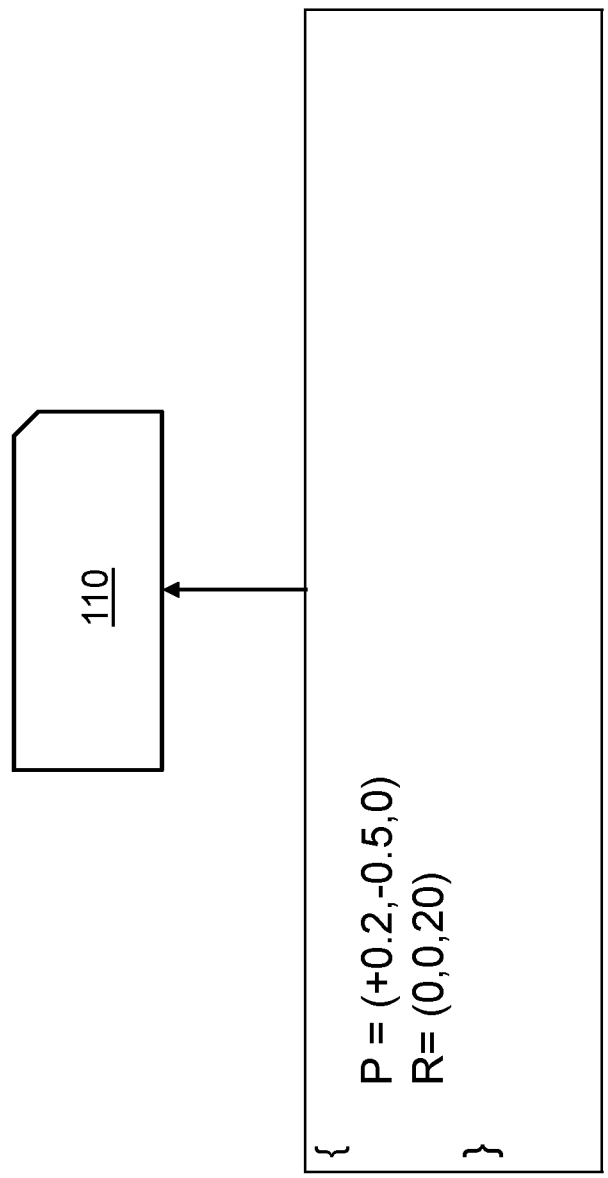
FIG. 5 shows an example of processing assist data which contains a processing instruction derived from an analysis result of a video data part.

FIG. 5 shows an example of processing assist data 110 which contains a processing instruction derived from an analysis result of a video data part. In this particular example, the processing assist data may define a position and rotation of a handheld camera relative to a user, as also further explained with reference to FIG. 8.

In general, the processing assist data 110 may be provided in a manner which enables the receiver system to associate the processing assist data 110 with the video stream or the decoded video data. For example, the processing assist data 110 may contain an identifier of the video stream. Various other means of association are equally conceivable. For example, in some embodiments, the video stream may link to the processing assist data 110, e.g., by containing an URL at which the processing assist data 110 is accessible. In some embodiments, the processing assist data 110 may be provided in a manner which enables the receiver system to associate the processing assist data 110 with a specific part of the video stream or decoded video data part, for example the same part which was used as input to the analysis on the basis of which the processing assist data 110 was generated. For example, the intermediary system may include timing information in the processing assist data 110 which may be indicative of the part of the video stream or the decoded video data part from which the processing assist data was generated. In a specific example, the timing information may be a sequence number and/or a content timestamp which is also present in the video stream, such as a Presentation TimeStamp (PTS) value.

In general, examples of analysis by the intermediary system may include the following. In the previously mentioned and specific example of Social VR, such analysis may include performing foreground/background segmentation. Accordingly, the processing assist data 110 may comprise a 1-bit mask identifying foreground and background. The analysis may further include detecting the location and orientation of the HMD to identify the location and orientation of the user's head and face in a video frame. Accordingly, the processing assist data 110 may comprise corresponding location data and orientation data. The analysis may further include selecting a part and angle of a 3D model for facial reconstruction, e.g., to replace the HMD occluding part of the user's face. Accordingly, the processing assist data 110 may further comprise an indication of the angle and the part of the 3D model's which is to be used.

In some embodiments, the processing assist data 110 may be comprised of different types of data, such as the aforementioned 1-bit segmentation mask and location data and orientation data. In such embodiments, the different types of data may also be transmitted separately, e.g., as processing assist data parts, and in some embodiments may be provided at different time intervals. For example, if the processing assist data 110 contains calibration data and a 1-bit segmentation mask, such calibration data may be provided once at a start of streaming while the 1-bit segmentation mark may be provided every $n^{th}$ video frame, with $n \geq 1$, or adaptively and thereby a-periodically depending on an amount of motion in the video data.

FIGS. 6A-C show an example of foreground/background segmentation, for which the intermediary system may generate a segmentation mask and provide the segmentation mask to the receiver system as processing assist data. Here, FIG. 6A shows a video frame 600 containing a person 602 within a room 604. The person 602 may represent a foreground object of interest, while the room 604 may represent a background (also referred to as 'surroundings') of the foreground object. As shown in FIG. 6B, the room representing the background may be removed by so-called background removal techniques, yielding a processed video frame 610 showing the person 602 while omitting the background. The analysis needed for background removal may be performed by the intermediary system as described elsewhere. For example, the intermediary system may perform foreground/background segmentation, which is known per se, and subsequently provide a segmentation mask 620 to the receiver system as or as part of processing assist data. The segmentation mask 620 may take various forms, such as a labeling of image elements of the video frame 600. For example, such labeling may use 0's and 1's, as shown in FIG. 6C. Here, a labeling with '0' may denote image elements belonging to the background and may indicate that these are not to be rendered, e.g., by making these transparent, while a labeling with '1' may denote image elements belonging to the foreground which may be meant to be rendered. Such a segmentation mask may be easily compressed, and may thus be generated by the intermediary system and provided to the receiver system in real-time.

FIGS. 7A-7H show an example of HMD removal, for which the intermediary system may detect the position and the orientation of an HMD in a video frame and provide the position and the orientation of the HMD in the video frame as processing assist data to the receiver system. Such HMD removal is known per se, see, e.g., [3], and may assume a 3D model of the user's face to be available or to be generated, e.g., in the form of an UV projection. The relevant part of the user's face may be selected from this 3D model, appropriately sized, adjusted for color and lighting differences between the model and the video frame, and then overlaid over the detected HMD.

Figure 7A:
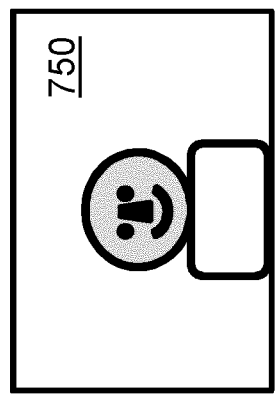
Figure 7E:
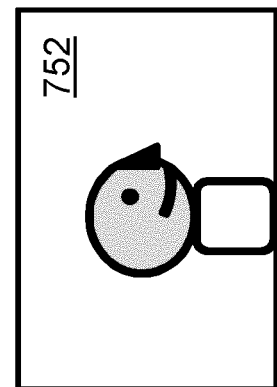
Figure 7C:
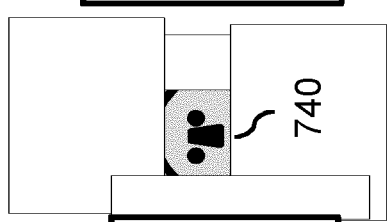
Figure 7B:
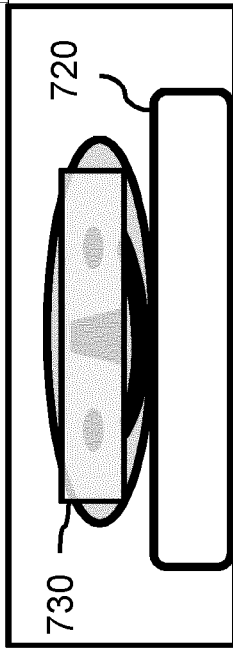
Figure 7D:
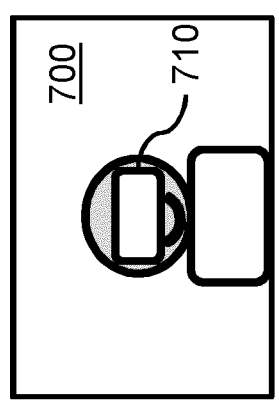
Figure 7F:
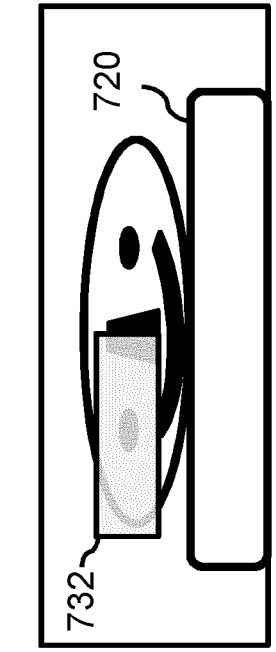
Figure 7H:
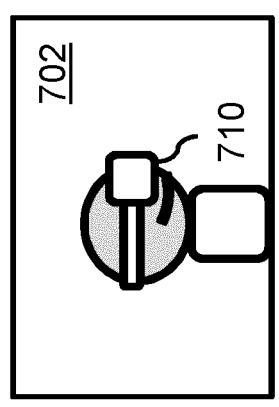

A (simplified) procedure is shown in FIGS. 7A-7D for a front facing user and in FIGS. 7E-7H for a side-facing user. First, the HMD 710 may be detected in a video frame 700, 702 (FIGS. 7A, 7E), e.g., in the form of a position and orientation of the HMD. The purpose of such a detection may be to detect the part of the user's face, including its orientation, which is occluded by the HMD 710 and which may be replaced by an image part generated from the 3D model. Based on the position and orientation of the HMD, a relevant part 730, 732 of the 3D model 720 may be selected (FIGS. 7B, 7F), which may be rendered from a desired perspective as an image part 740, 742 showing the part of the face to be overlaid over the video frame. The image part 740, 742 may be overlaid to obtain a 'HMD-removed' video frame 750, 752 (FIGS. 7D, H).

For such and similar types of HMD removal, the processing assist data may contain several types of data, including but not limited to one or more of:

- The detected position and orientation of the HMD in the video frame. This may be described as the center point of the HMD in the frame (indicating x and y coordinates, possible depth if the video frame includes depth), or as the coordinates of a bounding box (which also include size information), and may describe the orientation using an axis system with a third (z) axis orthogonally coming out of the frame, allowing orientation to be described in terms of a vector, or in terms of yaw-pitch-roll.
- The part of the 3D model to be used and the scaling to be applied for appropriate sizing. This may assume the same 3D model is available at both the intermediary system and the receiver system. The part of the 3D model may be indicated as coordinates in the 3D model's UV projection, where the orientation may also be described in a 3D axial system. Note that the part of the 3D model to be used may be similar for different orientations, and therefore both coordinates and the orientation may be indicated by the processing assist data.
- The exact or at least approximate location where the part of the 3D model may need to be placed in the original video frame. The location may be given in coordinates in the video frame, including depth coordinates if applicable.
- The adjustments to be made to the final result, for example in terms of filters to be applied to (possibly specified) parts of the resulting video frame, for example edge smoothing, color correction and/or lighting correction.

Various other types of analysis for HMD removal, and corresponding types of processing assist data, are equally conceivable. For example, detected facial expression and eye orientation may also be part of the processing assist data.

Figure 8:
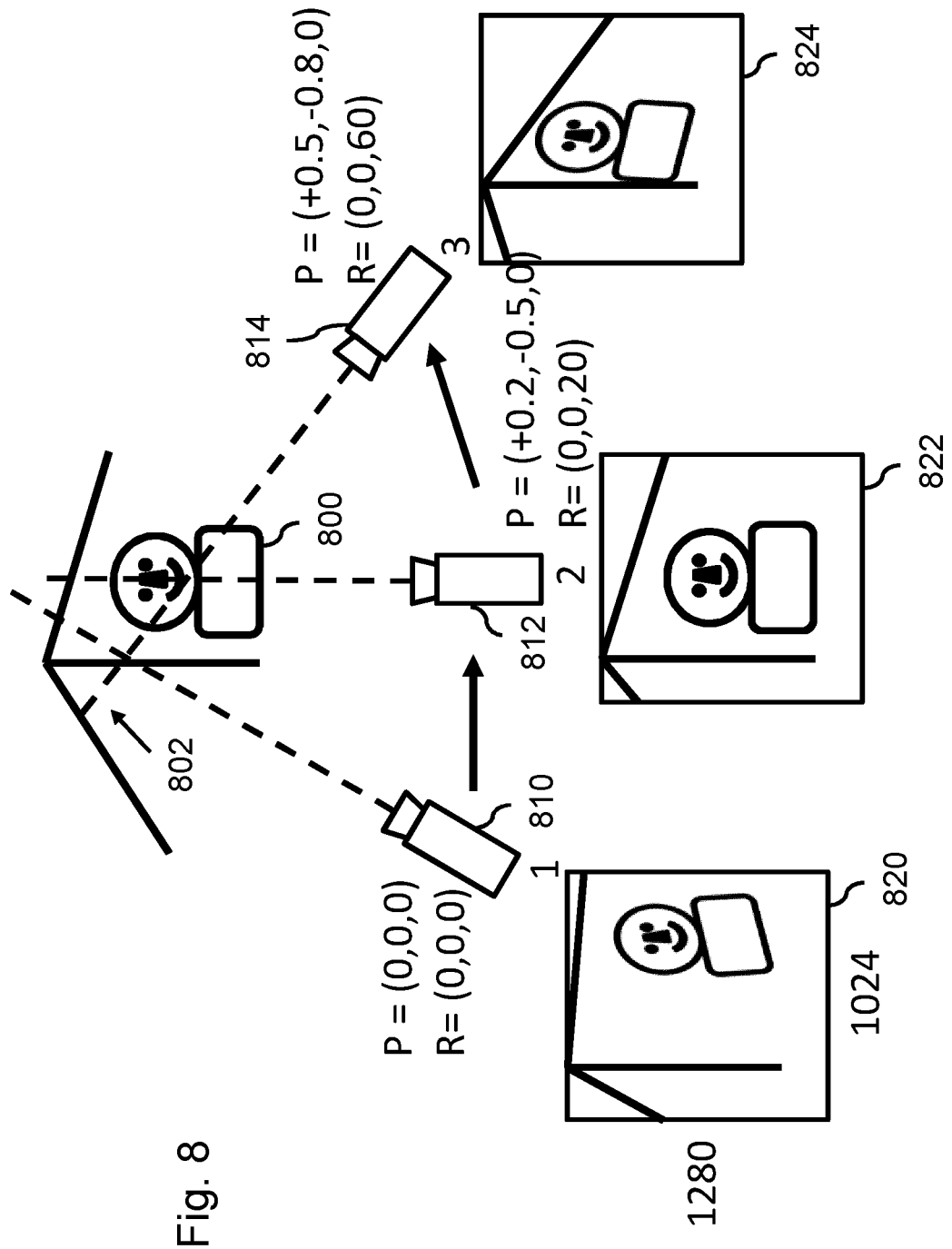
FIG. 8 shows an example of processing assist data being used to indicate a change of position and/or orientation of a handheld camera recording a video.

FIG. 8 shows an example of processing assist data being used to indicate a change of position and/or orientation of a handheld camera recording a video of a user, for example for video communication. The camera 810-814 is shown in FIG. 8 at different positions 1-3 relative to a user 800 being recorded, and may for example be held by the user 800 itself or by another person. For communication purposes, it may be desirable to obtain a stable video of the user 800. However, the camera 810-814 may move during the recording, as also shown in FIG. 8 by the camera being located at different positions 1-3 and the camera at each position being indicated with a respective reference numeral 810-814. It may be possible to obtain a stable video using known video stabilization techniques. A better stabilization may be obtained if the camera movement is known. Such stabilization may then be similar to 3D reconstruction which may involve moving the camera around an object, e.g., using a handheld camera or a drone, to obtain a 3D reconstruction of the object, which may then allow the object to be shown from a particular (stable) perspective.

The intermediary system as described elsewhere may perform an analysis which may assist in such video stabilization. In FIG. 8, the camera 810-814 is shown to be moved from position 1 to position 2 to position 3. The resulting video frames 820-824 are shown with the camera. As the user itself is stable, he/she is preferably shown stable in the video stream rendered by the receiver system. This may be achieved in different ways. The following describes two ways which each require that the movement of the camera is identified, which may be done based on image analysis.

A first way may be to detect the actual movement of the camera 810-814, and indicate this movement as processing assist data to the receiver system. The movement may comprise or consists of a change in position and a change in orientation of the camera. The detection itself may be done using static background parts. In this example, the user 800 may be in a room 802 near the corner of the room. The lines where walls meet and where ceiling and walls meet are shown. As the camera moves, the perspective on this static background changes and thus the camera movement may be derived from captured video frames, as known in the art.

For describing a change in movement and orientation, an axial system may be defined. Such an axial system typically consists of an X, Y and Z axis, and rotations on the axis may be defined using either a right-handed or left-handed method (e.g., thumb in direction of the axis, fingers point in the positive rotation direction). Looking straight forward may be defined as 0 rotation on all axis. Thus, an initial video frame 820 from a moving camera may be defined by position P=(0, 0, 0) and rotation R=(0, 0, 0). Updates to the position and rotation may be sent by sending new position and rotation value vectors, or by sending updates on the previous values. For example, camera position 2 shown is to the left (negative Y) and a bit forward (positive X), and rotated on the vertical axis (positive Z rotation), which may be represented as position P=(+0.2, −0.5, 0) and rotation R=(0, 0, 20°). Similarly, camera 3 position may be represented as P=(+0.5, −0.8, 0) and rotation R=(0, 0, 60°). This information may be provided as processing assist data to the receiver system, possibly with a reference to the timestamp of a video frame to synchronize said data with the video frame.

A second way may be to describe the change in the position and orientation of the object captured in the video frame. As the camera moves, the object may be captured from a different position, and the orientation of the object in the captured video frames may be different. The movement of the object in the video frame may be described by a translation and rotation vector on 3 axes. These values may be determined by analyzing the captured video frames, as known in the art.

In FIG. 8, this is shown by the resulting video frames 820,824 showing the user 800 at different positions inside the video frame's borders and depicting the user 800 from different perspectives. Again, the position P and rotation R may be described in absolute numbers or in relative numbers compared to the previous video frame. For example, if the video frames 820-824 have a resolution of 1024 (x-axis) by 1280 (y-axis) and the video frames are captured by a regular RGB camera, e.g., there being no depth values, the position of the user 800 in each video frame 820-824 may be indicated using the position of a single point, but preferably the position of a number of points. For example, the position of the user in the respective frames from camera positions 1, 2 and 3 may be, using the tip of the nose as a single point, (800, 840), (512, 640) and (512, 700). The rotation of the object, in this case the user, may be described as rotation on the axis, whereby the x-axis is coming straight out of the frame. Again, when assuming that the video frame 820 is defined by a rotation R of 0 on all axis (e.g. the object is not considered having a specific front side), then the rotation in the video frame 822 is (0, 0, −20) and in the video frame 824 (0, 0, −60).

It is noted that in FIG. 8, the camera positions and orientations are only shown schematically, and do not necessarily represent actual positions and orientation. For example, camera movements may be substantially smaller than depicted.

Figure 9:
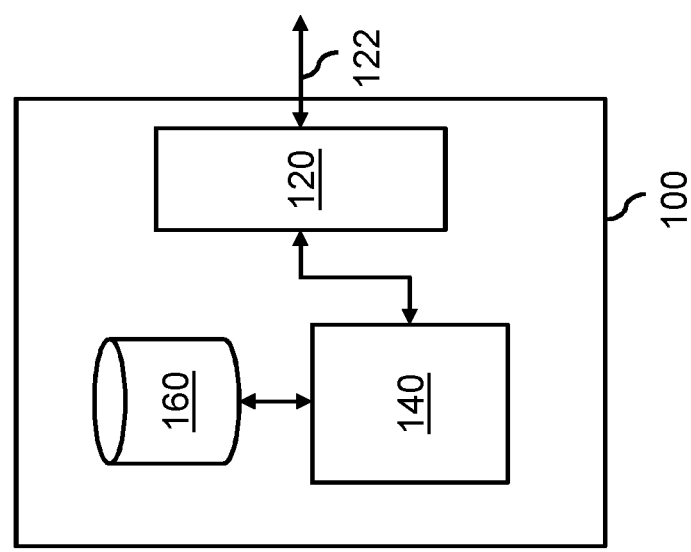
FIG. 9 shows a processor system for assisting a receiver system in processing video data by providing processing assist data to the receiver system.

FIG. 9 shows a processor system 100 for assisting a receiver system in processing video data by providing processing assist data to the receiver system. The processor system may represent the processor system 100 of FIGS. 2 and 4, or in general any processor system described as generating the processing assist data, such as any 'intermediary system'. The processor system 100 is shown to comprise a processor 140 which may be configured, e.g., by hardware design or software, to perform operations described with reference to FIGS. 2 and 4 and elsewhere pertaining to the generating of the processing assist data. For example, the processor 120 may be embodied by a single Central Processing Unit (CPU), but also by a combination or system of such CPUs and/or other types of processing units, such as for example Graphics Processing Units (GPUs). The processor system 100 is further shown to comprise a data storage 160, such as internal memory, a hard disk, a solid-state drive, or an array thereof, which may be used to store or buffer data such as received parts of the video stream and/or decoded video data parts and/or any analysis results. FIG. 9 further shows the processor system 100 to comprise a network interface 120, which may be any suitable type of network interface via which the video stream may be received and possibly forwarded to the receiver system and via which the processing assist data may be provided to the receiver system, with all types of data being indicated by reference numeral 122. For example, the network interface 120 may be a wireless network interface, e.g., based on Wi-Fi, Bluetooth, ZigBee, 4G or 5G mobile communication, or a wired network interface, e.g., based on Ethernet or optical fiber. For example, the network interface 120 may be a local area network (LAN) network interface or an interface to wide area network (WAN) such as the Internet.

The processor system 100 may be embodied by a (single) device or apparatus. For example, the processor system 100 may be embodied by a server, workstation, personal computer, etc. The processor system 100 may also be embodied by a distributed system of such devices or apparatuses. An example of the latter may be the functionality of the processor system 100 being at least in part distributed over network elements in a network. In another example, the processor system 100 may be embodied by an edge node of a 5G or next-gen telecommunication network.

Figure 10:
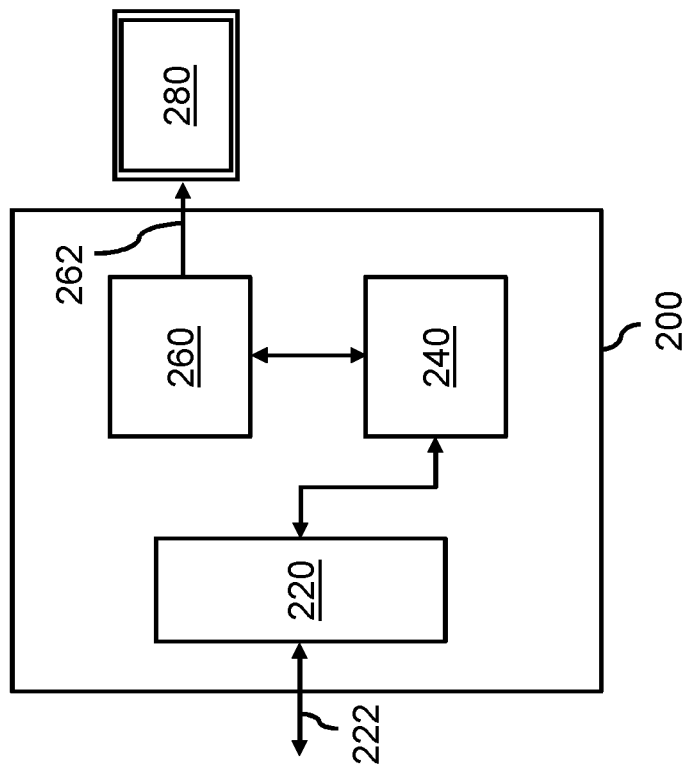
FIG. 10 shows a processor system for processing video data using processing assist data received from an intermediary system.

FIG. 10 shows a processor system 200 for processing video data using processing assist data received from an intermediary system. The processor system may represent the processor system 200 of FIGS. 2 and 4, or in general any processor system described as using the processing assist data, such as any 'receiver system'. The processor system 200 is shown to comprise a network interface 220 which may be configured to receive a video stream and/or processing assist data, both types of data being indicated by reference numeral 222. The network interface 220 may be any suitable type of interface for receiving said data, including but not limited to a type of network interface as described with reference to FIG. 9. The processor system 200 may further comprise a processor 240 which may be configured, e.g., by hardware design or software, to perform operations described with reference to FIGS. 2 and 4 and elsewhere pertaining to the using of the processing assist data. In some embodiments, the processor 240 may generate and output display data 262 to a display 280 such as an HMD. The display data 262 may comprise at least part of the video data processed using the processing assist data. In other embodiments, the processor 240 may output rendered video data which may be output to the display 280 by a display output 260.

The processor 240 may be embodied by a single Central Processing Unit (CPU), but also by a combination or system of such CPUs and/or other types of processing units, such as for example Graphics Processing Units (GPUs). Although not shown in FIG. 10, the processor system 200 may also comprise a data storage, such as internal memory, a hard disk, a solid-state drive, or an array thereof, which may be used to buffer data, e.g., received parts of the video stream and/or decoded video data parts and/or processing assist data. The processor system 200 may be embodied by a (single) device or apparatus. For example, the processor system 200 may be embodied as smartphone, personal computer, laptop, tablet device, gaming console, set-top box, television, monitor, projector, smart watch, smart glasses, media player, media recorder, head mounted display device, etc. The processor system 200 may also be embodied by a distributed system of such devices or apparatuses.

In general, the processor system 100 of FIG. 9 and the processor system 200 of FIG. 10 may each be embodied as, or in, a device or apparatus. The device or apparatus may comprise one or more (micro)processors which execute appropriate software. The processors of either system may be embodied by one or more of these (micro)processors. Software implementing the functionality of either system may have been downloaded and/or stored in a corresponding memory or memories, e.g., in volatile memory such as RAM or in non-volatile memory such as Flash. Alternatively, the processors of either system may be implemented in the device or apparatus in the form of programmable logic, e.g., as a Field-Programmable Gate Array (FPGA). Any input and/or output interfaces may be implemented by respective interfaces of the device or apparatus, such as a network interface. In general, each unit of either system may be implemented in the form of a circuit. It is noted that either system may also be implemented in a distributed manner, e.g., involving different devices.

FIG. 11 shows a computer-implemented method 300 for assisting a receiver system in processing video data which is streamed as a video stream to the receiver system via a network. The processing of the video data by the receiver system may be dependent on an analysis of the video data. The method 300 may comprise, in a step titled "RECEIVING VIDEO STREAM", via the network, receiving 310 the video stream. The method 300 may further comprise, in a step titled "DECODING AT LEAST PART OF VIDEO STREAM", decoding 320 at least part of the video stream to obtain a decoded video data part. The method 300 may further comprise, in a step titled "ANALYZING DECODED VIDEO DATA PART", analyzing 330 the decoded video data part to obtain an analysis result. The method 300 may further comprise, in a step titled "GENERATING PROCESSING ASSIST DATA", generating 340 processing assist data comprising the analysis result or a processing instruction derived from the analysis results. The method 300 may further comprise, in a step titled "PROVIDING PROCESSING ASSIST DATA TO RECEIVER SYSTEM", via the network, providing 350 the processing assist data to the receiver system to enable the receiver system to process the video data using the analysis result or the processing instruction provided by the processing assist data.

FIG. 12 shows a computer-implemented method 400 for processing video data using processing assist data received from an intermediary system. The method 400 may comprise, in a step titled "RECEIVING VIDEO STREAM", via the network, receiving 410 the video stream. The method 400 may comprise, in a step titled "DECODING VIDEO STREAM", decoding 420 the video stream to obtain the video data. The method 400 may further comprise, in a step titled "PROCESSING VIDEO DATA USING PROCESSING ASSIST DATA", processing 440 the video data to obtain processed video data, wherein the processing may be dependent on an analysis of at least part of the video data. The method 400 may further comprise, in a step titled "RECEIVING PROCESSING ASSIST DATA FROM INTERMEDIARY SYSTEM", receiving 430 processing assist data comprising an analysis result of the analysis of at least said part of the video data, or a processing instruction derived from the analysis results. The step 440 of processing the video data may comprise performing the processing of the video data using the analysis result or the processing instruction provided by the processing assist data.

It will be appreciated that, in general, the operations of method 300 of FIG. 11 and/or method 400 of FIG. 12 may be performed in any suitable order, e.g., consecutively, simultaneously, or a combination thereof, subject to, where applicable, a particular order being necessitated, e.g., by input/output relations. In particular, any steps of 'receiving the video stream' and 'decoding the video stream' may be performed in an ongoing manner in which subsequent parts of the video stream are received and decoded, and which steps may be performed simultaneously with steps pertaining to the analysis or processing of previously decoded video data part(s).

It is noted that any of the methods described in this specification, for example in any of the claims, may be implemented on a computer as a computer implemented method, as dedicated hardware, or as a combination of both. Instructions for the computer, e.g., executable code, may be stored on a computer readable medium 500 as for example shown in FIG. 13, e.g., in the form of a series 510 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 13 shows by way of example an optical storage device 500.

In an alternative embodiment of the computer readable medium 500 of FIG. 13, the computer readable medium 500 may comprise transitory or non-transitory data 510 represent the processing assist data described in this specification.

Figure 14:
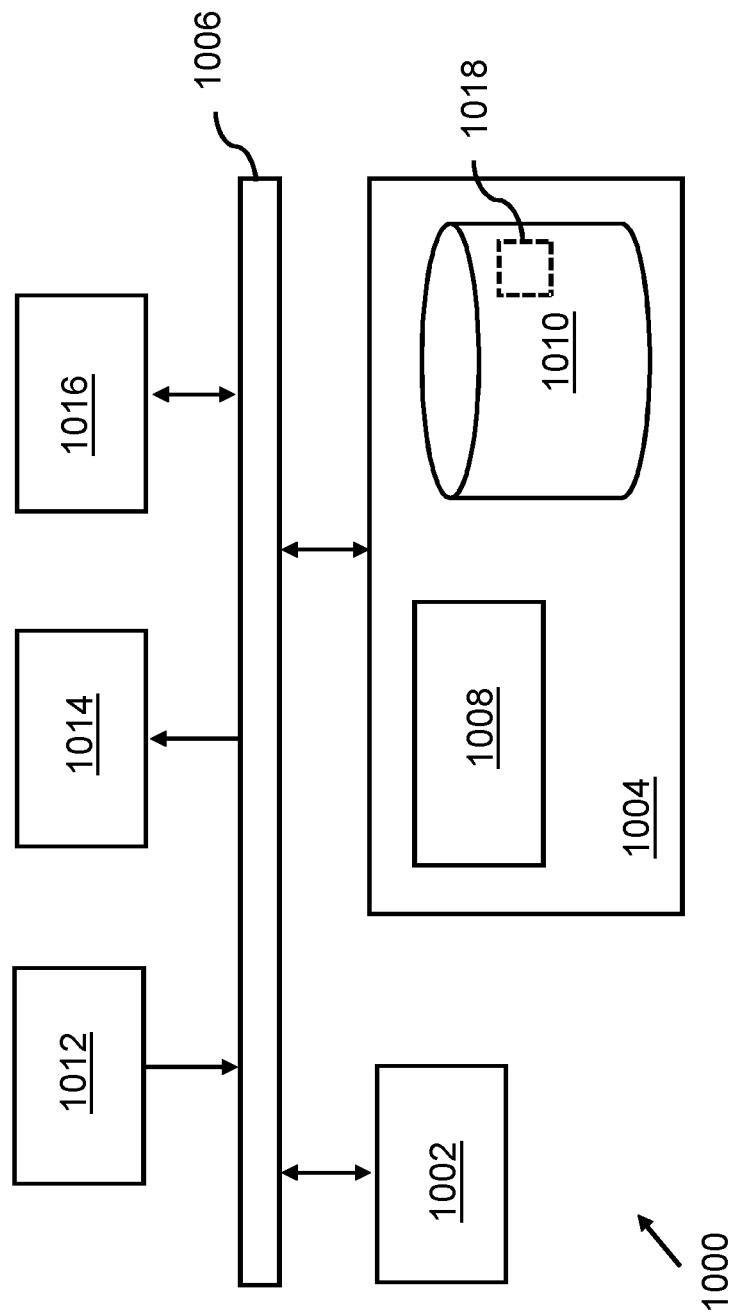
FIG. 14 shows an exemplary data processing system.

FIG. 14 is a block diagram illustrating an exemplary data processing system 1000 that may be used in the embodiments described in this specification. Such data processing systems include data processing entities described in this specification, including but not limited to the processor systems, intermediary systems and receiver systems as described with reference to FIGS. 2, 4, 5-10 and elsewhere, and others.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 14, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a processor system as described with reference to FIG. 9 or an intermediary system described with reference to FIGS. 2 and 4. In that case, application 1018 may represent an application that, when executed, configures data processing system 1000 to perform the functions described with reference to said entity. In another example, data processing system 1000 may represent a processor system as described with reference to FIG. 10 or a receiver system as described with reference to FIGS. 2 and 4. In that case, application 1018 may represent an application that, when executed, configures data processing system 1000 to perform the functions described with reference to said entity.

In accordance with an abstract of the present specification, an intermediary system and method may be provided for assisting a receiver system in processing video data which is streamed as a video stream to the receiver system via a network. The processing of the video data by the receiver system may be dependent on an analysis of the video data. The intermediary system may provide processing assist data to the receiver system which comprises an analysis result or a processing instruction derived from the analysis results. Accordingly, the receiver system may process the video data without a need for the receiver system itself to analyze the video data, thereby offloading computational complexity to the intermediary system. Compared to techniques in which most or all of the processing is performed by the intermediary system, an advantage of continuing to process the video data at the receiver system may be that the receiver system may already decode the video stream while the video stream is decoded and/or analyzed by the intermediary system. This may reduce the delay from transmission by a sender system to display by the receiver system.

In the claims, any reference signs placed between parentheses shall not be construed as limiting the claim. Use of the verb "comprise" and its conjugations does not exclude the presence of elements or steps other than those stated in a claim. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A processor system configured for assisting a receiver system in processing video data which is streamed as a video stream to the receiver system via a network, wherein the processing of the video data by the receiver system is dependent on an analysis of the video data and comprises compositing an object into the video data, the processor system comprising:

a network interface to the network;

a processor configured to:

via the network interface, receive the video stream;

via the network interface, forward the video stream to the receiver system;

via the network interface, provide object data to the receiver system, the object data defining at least part of the object;

sequentially decode the video stream to obtain a series of decoded video data parts;

sequentially analyze the decoded video data parts to obtain an analysis result including a characteristic of a composition of the object into the video data, such as a position and/or orientation of the object;

sequentially generate processing assist data for the individual ones of the decoded video data parts to obtain a series of processing assist data comprising the analysis result or a processing instruction derived from the analysis result;

via the network interface, provide the series of processing assist data to the receiver system as a processing assist data stream to enable the receiver system to process the video data as decoded by the receiver system using the analysis result or the processing instruction provided by the processing assist data, wherein the processor system provides the processing assist data for a video data part to the receiver system after the receiver system has started decoding the video data part.

2. The processor system according to claim 1, wherein the processor is configured to analyze the decoded video data part by at least one of the group of:

a segmentation technique, whereby the analysis result comprises a segmentation of an object in the decoded video data part;

an object tracking technique, whereby the analysis result comprises a position of an object in the decoded video data part; and a calibration technique, whereby the analysis result comprises a calibration parameter used in the processing of the video data.

3. The processor system according to claim 1, wherein the processor is configured to include timing information in the processing assist data, the timing information being indicative of the part of the video stream or the decoded video data part from which the processing assist data was generated.

4. The processor system according to claim 3, wherein the timing information comprises at least one of the group of:
a sequence number; and
a content timestamp.

5. A processor system configured for processing video data which is received as a video stream via a network, wherein the processing video data comprises compositing an object into the video data, the processor system comprising:
a network interface to the network;
a processor configured to:
via the network interface, receive the video stream from an intermediary system;
via the network interface, receive object data from the intermediary system, the object data defining at least part of the object;
sequentially decode the video stream to obtain a series of decoded video data parts;
via the network interface, receive a processing assist data stream comprising a series of processing assist data comprising an analysis result of an analysis of the individual ones of the decoded video data parts of the video data, the analysis result including a characteristic of a composition of the object into the video data, such as a position and/or orientation of the object, or a processing instruction derived from the analysis result, wherein the processor system has started decoding of a video data part before the processing assist data of the video data part is provided to the processor system from the intermediary system; and
sequentially process the decoded video data parts to obtain processed video data comprising the compositing of the object into the video data using the analysis result or the processing instruction provided by the processing assist data.

6. The processor system according to claim 5, wherein the processing assist data comprises a segmentation of an object in the part of the video data, and wherein the processor is configured to use the segmentation of the object for processing video data of the object or video data outside of the object.

7. The processor system according to claim 5, wherein the processing assist data comprises timing information, the timing information being indicative of the part of the video stream or the decoded video data part from which the processing assist data was generated, and wherein the processor is configured to identify the part of the video stream or the decoded video data part on the basis of the timing information and to use the analysis result or the processing instruction provided by the processing assist data specifically for the processing of said part.

8. A system comprising an intermediary system and a receiver system, wherein:
the intermediary system is configured for assisting the receiver system in processing video data which is streamed as a video stream to the receiver system via a network, wherein the processing of the video data by the receiver system is dependent on an analysis of the video data and comprises compositing an object into the video data, the intermediary system comprising:
a network interface to the network;
a processor configured to:
via the network interface, receive the video stream from a stream source in the network;
via the network interface, forward the video stream to the receiver system;
via the network interface, provide object data to the receiver system, the object data defining at least part of the object;
sequentially decode the video stream to obtain a series of decoded video data parts;
sequentially analyze the decoded video data parts to obtain an analysis result including a characteristic of a composition of the object into the video data, such as a position and/or orientation of the object;
sequentially generate processing assist data for the individual ones of the decoded video data parts to obtain a series of processing assist data comprising the analysis result or a processing instruction derived from the analysis result;
via the network interface, provide the series of processing assist data as a processing assist data stream to the receiver system, wherein the intermediary system provides the processing assist data for a video data part to the receiver system after the receiver system has started decoding the video data part;
the receiver system is configured for processing video data which is received as a video stream via a network, the receiver system comprising:
a network interface to the network;
a processor configured to:
via the network interface, receive the video stream from the intermediary system;
via the network interface, receive the object data from the receiver system;
sequentially decode the video stream to obtain a series of decoded video data parts;
via the network interface, receive the processing assist data stream comprising the series of processing assist data of the individual ones of the decoded video data parts from the intermediary system, and wherein the processing assist data of a decoded video data part is received from the intermediary system at least partially in parallel to decoding said part of the video data;
sequentially process the decoded video data parts to obtain processed video data comprising the compositing of the object into the video data using the analysis result or the processing instruction provided by the processing assist data.

9. A computer-implemented method for assisting a receiver system in processing video data which is streamed as a video stream to the receiver system via a network, wherein the processing is dependent on an analysis of the video data and comprises compositing an object into the video data, the method comprising:
via the network, receiving the video stream;
via the network, forwarding the video stream to the receiver system;
via the network, providing object data to the receiver system, the object data defining at least part of the object;
sequentially decoding the video stream to obtain a series of decoded video data parts;
sequentially analyzing the decoded video data parts to obtain an analysis result including a characteristic of a composition of the object into the video data, such as a position and/or orientation of the object;
sequentially generating processing assist data for the individual ones of the decoded video data parts to obtain a series of processing assist data comprising the analysis result or a processing instruction derived from the analysis results;

via the network, providing the series of processing assist data as a processing assist data stream to the receiver system to enable the receiver system to process the video data as decoded by the receiver system using the analysis result or the processing instruction provided by the processing assist data, wherein the providing the processing assist data for a video data part to the receiver system is performed after the receiver system has started decoding the video data part.

10. A non-transitory computer-readable medium comprising a computer program, the computer program comprising instructions for causing a processor system to perform the method according to claim 9.

11. A computer-implemented method for processing video data which is received as a video stream via a network, wherein the processing video data comprises compositing an object into the video data, the method comprising:

via the network, receiving the video stream from an intermediary system;

via the network, receive object data from the intermediary system, the object data defining at least part of the object;

sequentially decoding the video stream to obtain a series of decoded video data parts;

receiving a processing assist data stream comprising a series of processing assist data from the intermediary system, the processing assist data comprising an analysis result of the analysis of the individual ones of the decoded video data parts of the video data, the analysis result including a characteristic of a composition of the object into the video data, such as a position and/or orientation of the object, or a processing instruction derived from the analysis result, wherein the decoding of a video data part has started before processing assist data of the video data part is provided from the intermediary system; and sequentially processing the decoded video data parts comprising the compositing of the object into the video data using the analysis result or the processing instruction provided by the processing assist data.

12. A non-transitory computer-readable medium comprising a computer program, the computer program comprising instructions for causing a processor system to perform the method according to claim 11.

13. A processor system configured for assisting a receiver system in processing video data which is streamed as a video stream to the receiver system via a network, wherein the processing of the video data by the receiver system is dependent on an analysis of the video data, the processor system comprising:

a network interface to the network;

a processor configured to:

via the network interface, receive the video stream;

via the network interface, forward the video stream to the receiver system;

sequentially decode the video stream to obtain a series of decoded video data parts;

sequentially analyze the decoded video data parts;

sequentially generate processing assist data for the individual ones of the decoded video data parts to obtain a series of processing assist data comprising the analysis result or a processing instruction derived from the analysis result, wherein the processor is configured to include timing information in the processing assist data, the timing information being indicative of the part of the video stream or the decoded video data part from which the processing assist data was generated;

via the network interface, provide the series of processing assist data to the receiver system as a processing assist data stream to enable the receiver system to process the video data as decoded by the receiver system using the analysis result or the processing instruction provided by the processing assist data, wherein the processor system provides the processing assist data for a video data part to the receiver system after the receiver system has started decoding the video data part.

14. The processor system according to claim 13, wherein the processor is configured to analyze the decoded video data part by at least one of the group of:

a segmentation technique, whereby the analysis result comprises a segmentation of an object in the decoded video data part;

an object tracking technique, whereby the analysis result comprises a position of an object in the decoded video data part; and a calibration technique, whereby the analysis result comprises a calibration parameter used in the processing of the video data.

15. The processor system according to claim 13, wherein the timing information comprises at least one of the group of:

a sequence number; and a content timestamp.

16. A processor system configured for processing video data which is received as a video stream via a network, the processor system comprising:

a network interface to the network;

a processor configured to:

via the network interface, receive the video stream from an intermediary system;

sequentially decode the video stream to obtain a series of decoded video data parts;

via the network interface, receive a processing assist data stream comprising a series of processing assist data comprising an analysis result of an analysis of the individual ones of the decoded video data parts of the video data, or a processing instruction derived from the analysis result, wherein the processing assist data includes timing information being indicative of the part of the video stream or the decoded video data part from which the processing assist data was generated, wherein the processor system has started decoding of a video data part before the processing assist data of the video data part is provided to the processor system from the intermediary system; and sequentially process the decoded video data parts to obtain processed video data using the analysis result or the processing instruction provided by the processing assist data, wherein the processor is configured to identify the part of the video stream or the decoded video data part on the basis of the timing information and to use the analysis result or the processing instruction provided by the processing assist data specifically for the processing of said part.

17. The processor system according to claim 16, wherein the processing assist data comprises a segmentation of an object in the part of the video data, and wherein the processor is configured to use the segmentation of the object for processing video data of the object or video data outside of the object.

18. A system comprising an intermediary system and a receiver system, wherein:
the intermediary system is configured for assisting the receiver system in processing video data which is streamed as a video stream to the receiver system via a network, and the processing is dependent on an analysis of the video data, the intermediary system comprising:
a network interface to the network;
a processor configured to:
via the network interface, receive the video stream from a stream source in the network;
via the network interface, forward the video stream to the receiver system;
sequentially decode the video stream to obtain a series of decoded video data parts;
sequentially analyze the decoded video data parts to obtain an analysis result;
sequentially generate processing assist data for the individual ones of the decoded video data parts to obtain a series of processing assist data comprising the analysis result or a processing instruction derived from the analysis result, wherein the processor is configured to include timing information in the processing assist data, the timing information being indicative of the part of the video stream or the decoded video data part from which the processing assist data was generated;
via the network interface, provide the series of processing assist data as a processing assist data stream to the receiver system, wherein the intermediary system provides the processing assist data for a video data part to the receiver system after the receiver system has started decoding the video data part;
the receiver system is configured for processing video data which is received as a video stream via a network, the receiver system comprising:
a network interface to the network;
a processor configured to:
via the network interface, receive the video stream from the intermediary system;
sequentially decode the video stream to obtain a series of decoded video data parts;
via the network interface, receive the processing assist data stream comprising the series of processing assist data of the individual ones of the decoded video data parts from the intermediary system, wherein the processing assist data includes the timing information, and wherein the processing assist data of a decoded video data part is received from the intermediary system at least partially in parallel to decoding said part of the video data;
sequentially process the decoded video data parts to obtain processed video data using the analysis result or the processing instruction provided by the processing assist data, wherein the processor is configured to identify the part of the video stream or the decoded video data part on the basis of the timing information and to use the analysis result or the processing instruction provided by the processing assist data specifically for the processing of said part.

19. A computer-implemented method for assisting a receiver system in processing video data which is streamed as a video stream to the receiver system via a network, wherein the processing is dependent on an analysis of the video data, the method comprising:
via the network, receiving the video stream;
via the network, forwarding the video stream to the receiver system;
sequentially decoding the video stream to obtain a series of decoded video data parts;
sequentially analyzing the decoded video data parts to obtain an analysis result;
sequentially generating processing assist data for the individual ones of the decoded video data parts to obtain a series of processing assist data comprising the analysis result or a processing instruction derived from the analysis results, wherein the processor is configured to include timing information in the processing assist data, the timing information being indicative of the part of the video stream or the decoded video data part from which the processing assist data was generated;
via the network, providing the series of processing assist data as a processing assist data stream to the receiver system to enable the receiver system to process the video data as decoded by the receiver system using the analysis result or the processing instruction provided by the processing assist data, wherein the providing the processing assist data for a video data part to the receiver system is performed after the receiver system has started decoding the video data part.

20. A non-transitory computer-readable medium comprising a computer program, the computer program comprising instructions for causing a processor system to perform the method according to claim 19.

21. A computer-implemented method for processing video data which is received as a video stream via a network, the method comprising:
via the network, receiving the video stream from an intermediary system;
sequentially decoding the video stream to obtain a series of decoded video data parts;
receiving a processing assist data stream comprising a series of processing assist data from the intermediary system, the processing assist data comprising an analysis result of the analysis of the individual ones of the decoded video data parts of the video data, or a processing instruction derived from the analysis result, wherein the processing assist data includes timing information being indicative of the part of the video stream or the decoded video data part from which the processing assist data was generated, wherein the decoding of a video data part has started before processing assist data of the video data part is provided from the intermediary system; and
sequentially processing the decoded video data parts using the analysis result or the processing instruction provided by the processing assist data, wherein the processor is configured to identify the part of the video stream or the decoded video data part on the basis of the timing information and to use the analysis result or the processing instruction provided by the processing assist data specifically for the processing of said part.

22. A non-transitory computer-readable medium comprising a computer program, the computer program comprising instructions for causing a processor system to perform the method according to claim 21.

* * * * *